United States Patent
Hoheisel et al.

(10) Patent No.: US 9,945,722 B2
(45) Date of Patent: Apr. 17, 2018

(54) ULTRA LOW POWER SOLID STATE SPECTRAL RADIOMETER

(71) Applicants: Raymond Hoheisel, Arlington, VA (US); David A. Scheiman, Alexandria, VA (US); Justin R. Lorentzen, Washington, DC (US); Phillip P. Jenkins, Cleveland Heights, OH (US); Robert J. Walters, Alexandria, VA (US)

(72) Inventors: Raymond Hoheisel, Arlington, VA (US); David A. Scheiman, Alexandria, VA (US); Justin R. Lorentzen, Washington, DC (US); Phillip P. Jenkins, Cleveland Heights, OH (US); Robert J. Walters, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 662 days.

(21) Appl. No.: 14/322,234

(22) Filed: Jul. 2, 2014

(65) Prior Publication Data
US 2015/0083890 A1    Mar. 26, 2015

Related U.S. Application Data

(60) Provisional application No. 61/880,719, filed on Sep. 20, 2013.

(51) Int. Cl.
*G01J 3/32* (2006.01)
*G01J 5/30* (2006.01)
(Continued)

(52) U.S. Cl.
CPC ............ *G01J 3/32* (2013.01); *G01J 3/0264* (2013.01); *G01J 3/0291* (2013.01);
(Continued)

(58) Field of Classification Search
CPC .... G01J 3/32; G01J 3/2803; G01J 3/36; G01J 3/0291; G01J 3/0264; G01J 5/46; G01J 5/30
See application file for complete search history.

(56) References Cited

U.S. PATENT DOCUMENTS 7,135,848 B1    11/2006 Ammar
7,250,747 B1    7/2007 Ammar
(Continued)

FOREIGN PATENT DOCUMENTS

EP    1923679    5/2008

OTHER PUBLICATIONS

Daniel Parry; NRL Develops Low Cost, High Efficiency Solar Sensor; News Release; (Aug. 12, 2013) pp. 1-2: US Naval Research Laboratory, Washington, DC.

*Primary Examiner* — Tony Ko
(74) *Attorney, Agent, or Firm* — US Naval Research Laboratory; Richard F. Bis

(57) ABSTRACT

A spectral radiometer system, measures incoming light intensity and spectral distribution in different wavelength-bands. An additional data storage device allows recording of the measured data. The inclusive sensor system yields very high sensitivity to incoming light. Furthermore, outstanding linearity of the detector response over several orders of magnitude of incoming light is achieved. Additional benefits are ultra low power consumption and minimum size. The sensor system can be used in remote solar radiation monitoring applications like mobile solar power units as well as (Continued)

in long-term environmental monitoring systems where high precision and low power consumption is a necessity.

10 Claims, 5 Drawing Sheets

(51) Int. Cl.
    *G01J 5/46*     (2006.01)
    *G01J 3/02*     (2006.01)
    *G01J 3/28*     (2006.01)
    *G01J 3/36*     (2006.01)

(52) U.S. Cl.
    CPC ............... *G01J 3/2803* (2013.01); *G01J 3/36* (2013.01); *G01J 5/30* (2013.01); *G01J 5/46* (2013.01)

(56) References Cited

U.S. PATENT DOCUMENTS

| | | |
|---|---|---|
| 2008/0259318 A1 | 10/2008 | Pan et al. |
| 2012/0280114 A1 | 11/2012 | Rodrigues et al. |
| 2015/0051498 A1* | 2/2015 | Darty ..................... A61B 5/447 |
| | | 600/477 |

* cited by examiner

ULTRA LOW POWER SOLID STATE SPECTRAL RADIOMETER

FIELD OF THE INVENTION

The present invention is generally related to measuring incoming light, data acquisition and power control. In particular the present invention includes a data storage device for recording measured data, and a sensor system yielding very high sensitivity to incoming light, where an increase of linearity of detector response to incoming light is achieved by several orders of magnitude over conventional sensor systems. The present invention provides ultra low power consumption and minimum size. The sensor system can be used in remote solar radiation monitoring applications like mobile solar power units as well as in long-term environmental monitoring systems.

BACKGROUND OF THE INVENTION

Mobile solar power units are recognized as promising means of decreasing the dependence of the military on fossil fuel generated power. To date, a multitude of mobile solar powered systems are under development that range from human portable, highly flexible, photovoltaic blankets, solar powered aircraft, trailer based hybrid power units, and underwater sensor applications. Spectral radiometers are widely used to measure the spectrum of emitted, transmitted or reflected light of a given material in numerous fields of the modern economy. Applications of spectral radiometers include environmental monitoring (Sun, water, soil, flora, etc), production control (liquids, solids, solutions, etc), medicine (tissue, blood, drugs, solutions, etc), opto-electronics (light emitters), trade (food, and other perishable goods) as well as monitoring in the fields of military and security operations (such as, object identification and sensing). Current spectral radiometers generally require either sophisticated optical components for beam forming and diffraction, refined electronic components for the signal readout or moving parts which often lead to high production costs. Furthermore, conventional spectral radiometry systems are shock-sensitive; they require long measurement times, and they consume considerable amounts of electrical power, making their use in remote environments disadvantageous. In contrast, the instant invention discloses a spectral radiometer having a novel minimum size, having ultra-low power, having integrated data storage functionality and a battery lifetime of up to several years, including a range of from less than about 2 years or less up to at least about 5 years or more, such that 10 or 15 years or more can be achieved. In addition, the system can be produced at the expense of less than twenty dollars ($20) and features very high sensitivity and linearity. Because of the modularity of the system, adjustment to different wavelength-bands, as well as operational capabilities involving different light intensities are easily possible, providing a tailored solution to the customers' needs. There are no alternative devices having comparably small dimensions.

SUMMARY OF THE INVENTION

Exemplary embodiments describe a novel spectral radiometer system, which measures incoming light intensity and spectral distribution in different wavelength-bands. An additional data storage device allows recording of the measured data. The inclusive sensor section yields very high sensitivity to incoming light. Furthermore, outstanding linearity of the detector response over several orders of magnitude of incoming light is achieved. Additional benefits are ultra low power consumption and minimal size. The sensor system can be used in remote solar radiation monitoring applications, such as mobile solar power units, as well as in long-term environmental monitoring systems, where high precision and ultra low power consumption are required.

Exemplary embodiments have wide applications in military and civilian tactical solar power radiation assessments, such as with solar power plant planning, and solar radiation monitoring. In addition, exemplary embodiments have wide application in radiation assessments related to agriculture, architecture, construction, power plant operations, environmental protection, ergonomics and the practice of medicine. Also, the measurement of the energy in different wavelength-bands of short-duration light pulses (burst measurements) can be carried out.

DETAILED DESCRIPTION OF THE INVENTION

The subject invention is a spectral radiometer 100 with sensitivity in several, adjustable wavelength-bands having adjustable detector sensitivity. Novel aspects of the exemplary embodiments of the spectral radiometer 100 include the ability to achieve fast, precise, multi-wavelength-band sensitive measurements with extraordinary linearity and the ability to operate over several orders of magnitude of incoming light intensity at low cost, (where an order of magnitude ratio scaled to 10, yields linear operability approaching at least over three orders of magnitude of incoming light intensity).

Description: The device is shown in a three-diode sensor section 201 configuration in FIG. 1; however, the configurations of exemplary embodiments of the spectral radiometer 100 can include four or more diodes 102, where the number of diodes 102 incorporated is limited only by cost and space (i.e., design choice of the size requirement) of the desired physical configuration of the device. In addition, exemplary embodiments of the spectral radiometer 100 design can incorporate less than three diodes. A diode 102 is referred to in this context as an element with spectrally dependent charge generation or recombination properties and/or spectrally dependent electrical resistance properties.

Figure 2A:
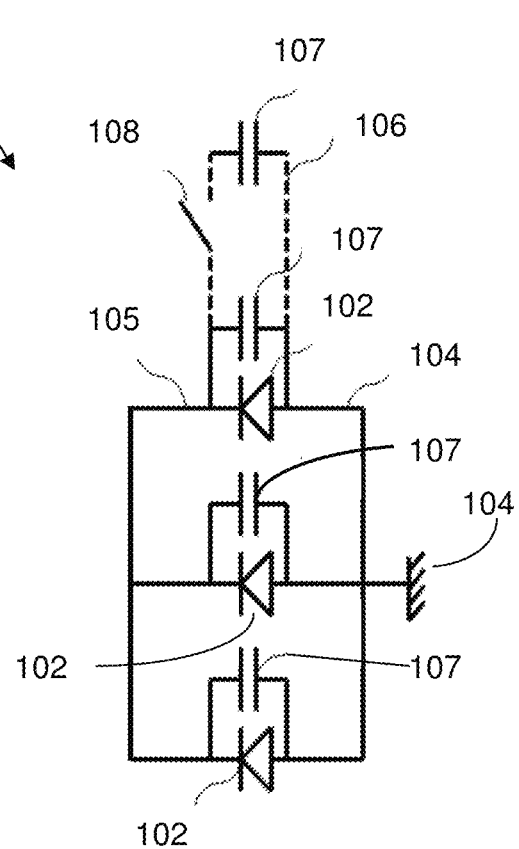
FIG. 2A illustrates a schematic of the three-diode sensor section 201, the diode 102 based spectral radiometer 100, where three diodes 102 have a common anode (104 connectors). The cathode 105 of each of the three diodes 102 has its own connector pin. The three diodes 102 are encapsulated in a small transparent housing (i.e., 3 diode sensor section 201), with dimensions including a diameter of roughly 5 mm. Such a package is commercially available and used for LEDs.
Figure 2B:
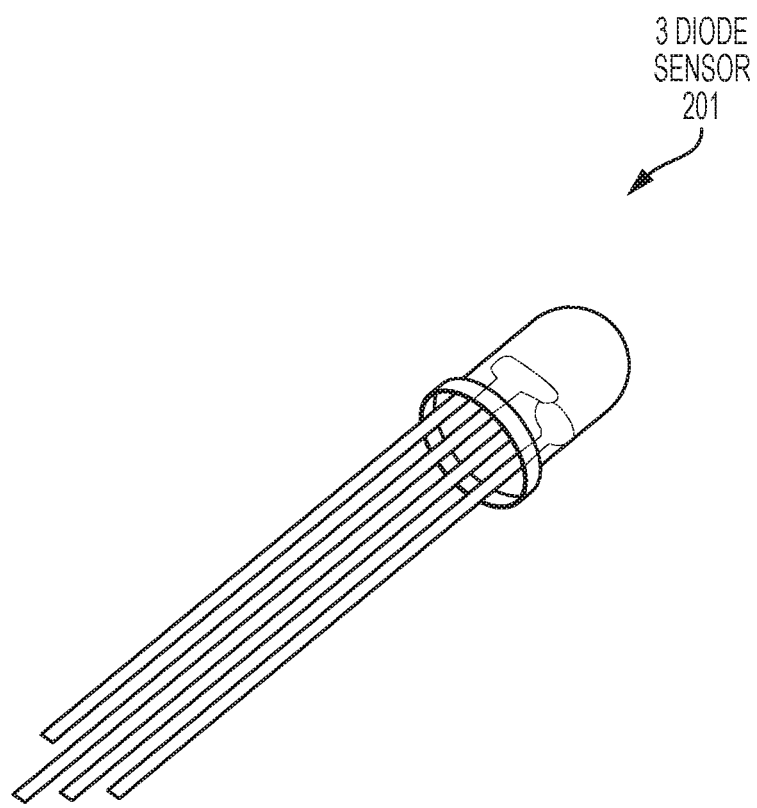
FIG. 2B illustrates the encapsulated three-diode sensor section 201 component of the spectral radiometer 100.

In a configuration of the exemplary embodiment, each junction of a first diode 102, a second diode 102 and a third diode 102 is formed from a semiconductor material of different effective bandgap energy. The bandgap energy, the reflection and absorption properties of each diode 102 define the wavelength range within which the first, second and third diodes 102 can absorb light. As shown in FIG. 2B, several diodes 102 can be encapsulated in a single, small housing forming the encapsulated three diode sensor section 201, where the housing of the encapsulated three diode sensor section 201 can be a molded housing having dimensions of only a few millimeters (i.e., 1 or 2 mm) up to about 5 mm or more diameter and/or length or height. The anode 104 of each diode 102 is connected to ground (110). The cathode 105 of each diode 102 is connected to a first port 109, a second port 109 and a third port 109 of a central processing unit 101, (herein referred to as CPU 101), where CPU 101 can have a plurality of input-output ports. In addition CPU 101 includes a computer processor and computer program code stored in memory of the CPU 101, and when executed by the computer processor, the program code causes the computer processor to measure data, calculate light intensity and other values, and record data in data storage device 119, which can have a capacity of at least up to about 128 megabytes (MB) or more; the storage capacity can be increased or reduced and is unlimited other than by size and space of existing storage technology available either as virtual storage capacity or physical memory. Each semiconductor diode 102 generally has a small inherent capacitance, where this inherent capacitance of the diode integrates the total energy of a light pulse (decoded as a voltage decrease), which can be easily read out later with slow standard electronics. The capacitance across the diode can be modified by first, second and third external capacitors 107 connected in parallel and/or in series with the diodes 102. In addition by implementing an electrical switch 108, which can operate either mechanically or electronically, additional capacitance, such as one or more of a capacitor 107 in parallel and/or in series with the diode 102 can be added which allows the modification of the overall capacitance across the diode 102 before or during measurements. A high precision clock or oscillator 117 is connected via a first data wire 116 from a port on the CPU 101. An integrated data storage unit 119 is connected via a second data wire 116 from a second port 109 of the CPU 101.

Figure 4:
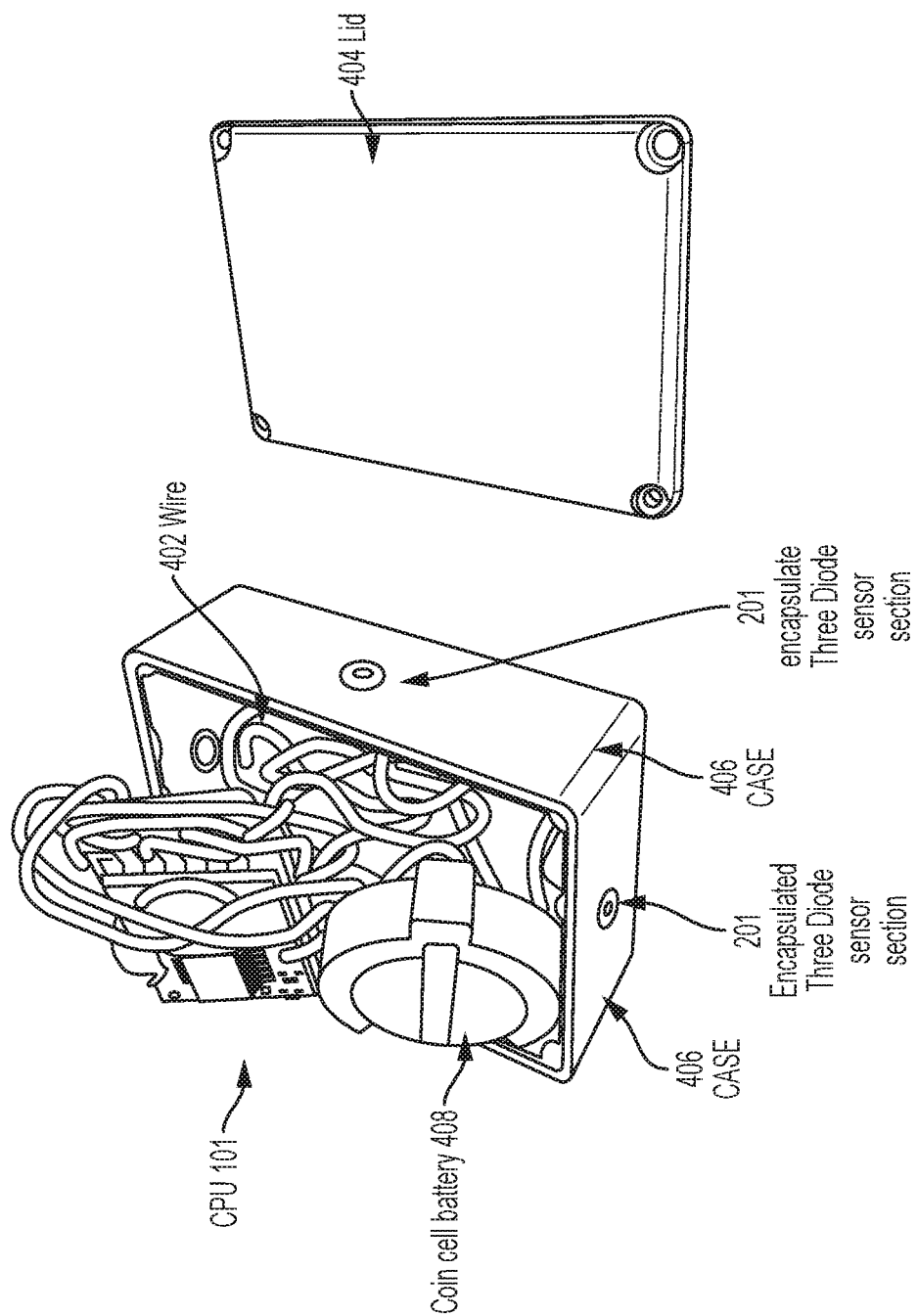
FIG. 4 illustrates an ultra low power solid state spectral radiometer 100 used in a military maneuver. Encapsulated three-diode sensor section 201 components are used to detect and measure the light intensity from different directions.

FIG. 4 illustrates an ultra low power (where an average power consumption is 100 microwatts (μW)) solid state spectral radiometer 100, where power consumption can vary from about 25 microwatts or less (approaching zero watts) up to about 125 microwatts or more, i.e., up to a few milliwatts (i.e., one or two milliwatts). Again referring to FIG. 4, the solid state spectral radiometer 100 as used in a military maneuver includes a housing or container, such as case 406 covered by a top covering assembly, such as lid 404, where the case 406 and lid 404 can be molded, with the lid 404 secured with fasteners, such as screws, clips or clamps or any other suitable fasteners. Furthermore, the case 406 contains connecting wire 402, where connecting wire 402 connects various components of the solid state spectral radiometer 100, including CPU 101, coin cell battery 408 and several encapsulated three diode sensor sections 201, where a typical coin cell battery 408 operates between about one half volts (½ v) up to about 2 to 6 volts or more (in exemplary embodiments, lithium-ion batteries exhibited about 3.7 v). Furthermore, in exemplary embodiments, more than one coin cell battery 408 is implemented into the solid state spectral radiometer 100. The several diodes 102 encapsulated as the three-diode sensor section 201 components are situated in openings at different sides of the case 406 and are used to detect and measure the light intensity from different directions. The case 406, including the lid 404, encasing the solid state spectral radiometer 100 of the instant invention, has a minimal size and weight of approximately 6 cm×4 cm×2.5 cm, weighing about 45 grams (approximately corresponding to English units of measure in size and weight of: a width ranging from about 2 inches up to about 3 inches; a depth ranging from about 1½ inches up to about 2 inches; and a height ranging from about 3 inches up to about 5 inches, and weighing about one tenth of a pound). In additional exemplary embodiments, the size of the case 406 can be even smaller or larger depending on the number of diode 102 and capacitor 107 components added to or subtracted from the solid state spectral radiometer 100 system configurations. In exemplary embodiments, there can be as few as one diode 102 (a one channel device), or two diodes 102 (a two channel device), or three diodes 102 (a three channel device) or four diodes 102 (a four channel device) or five diodes 102 (a five channel device) or more diodes 102/channels. The units have a dynamic range of at least 0.01-2 suns measured in 30 second intervals (where different time intervals are possible, either longer or shorter intervals), which is an important measure regarding when and how long (in long term expeditionary environments) mobile solar power units can be in the Sun. Thus, exemplary embodiments exhibit long-term monitoring operational capability in remote locations.

Figures 3A, 3B:
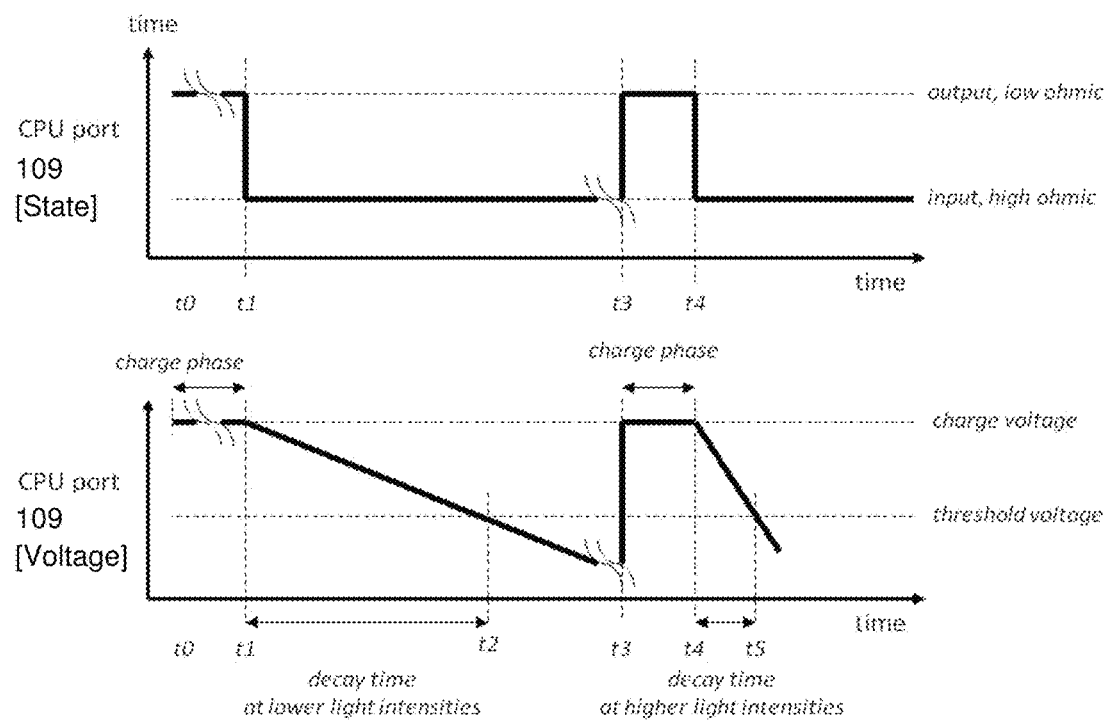
FIGS. 3A and 3B illustrate graphs of the electrical operation cycles of the diode 102 based spectral radiometer 100.

Operation: In the first exemplary embodiment the operation of the spectral radiometer 100 is illustrated in FIG. 3A and FIG. 3B, shown for one diode 102. Controlled by program code executing on CPU 101, at the beginning of the measurement cycle, in coordination with clock 117, at time t0, the state of a port 109 of the CPU 101 is set to high and low-ohmic status, so that it provides an output signal with positive voltage. During this process the diode 102 and the connected capacitor(s) 107 are electrically charged. The charge depends on the overall capacitance across the diode 102 and the applied positive voltage. After a settling time, at time t1, the port 109 of the CPU 101 is set to high-ohmic status. Depending on the bandgap energy and the optical reflection and absorption properties of the diode 102, incoming light of a specific wavelength range can be absorbed that can then lead to the generation or recombination of carriers. These photo-induced carriers discharge the diode 102 and the connected capacitors 107 leading to a decrease of the voltage across the diode 102. The higher the light intensity, the faster the discharge process happens and the faster the voltage decreases. In a second exemplary embodiment, if the CPU 101 offers analog sensing, also known as analog to digital conversion, the change in voltage with time is recorded which allows the determination of the light intensity. In instances where the CPU 101 offers only digital sensing, the time is measured until the voltage drops below a threshold voltage, at which time the binary reading of the voltage of the port 109 changes from high to low.

Referring again to FIGS. 3A and 3B, the time span it takes until the voltage drops below a certain voltage level is generally reciprocal to the incoming light intensity:

$$\text{decay time} \sim 1/(\text{light intensity}).$$

Again referring to FIG. 1, FIG. 3A and FIG. 3B, before the start of the next measurement cycle, at time t4, the diode 102 and its attached capacitor(s) 107 are charged again, from time t3 to t4, as described above.

Referring again to FIG. 1, FIG. 3A and FIG. 3B, with the diodes 102 being sensitive in different spectral bands, and by measuring the time of the voltage decay of the respective diodes 102, the light intensity in different spectral bands can be measured. This can be done simultaneously for all diodes 102.

Figure 1:
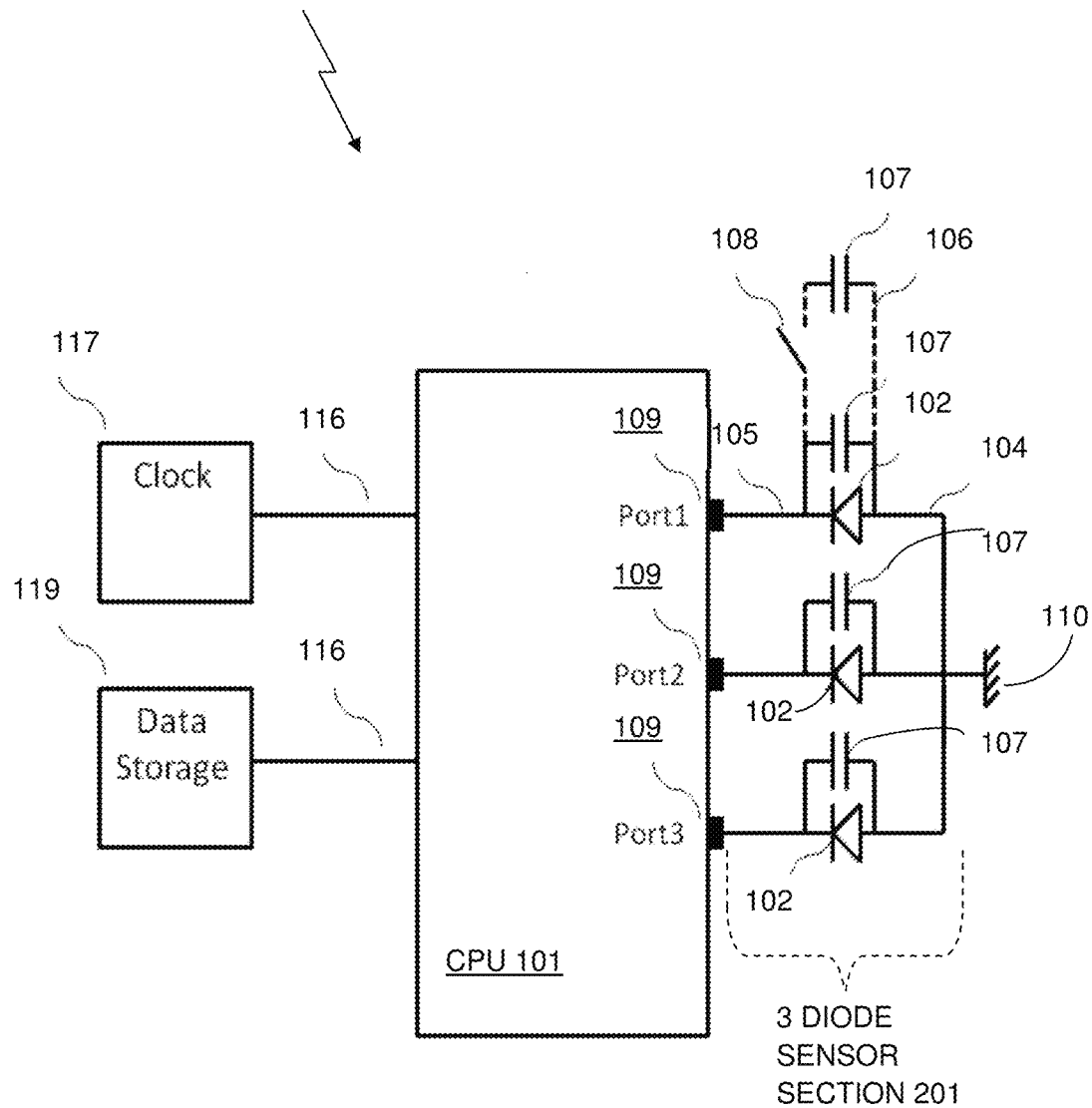
FIG. 1 illustrates a schematic diagram of a diode 102 based spectral radiometer 100, having three diodes 102.

Referring to FIG. 1, FIG. 3A and FIG. 3B, by changing the value of the external capacitor(s) 107, the decay time (i.e., the time until the voltage across the diode 102 decreases below a threshold voltage) can be adjusted. This allows the adaption of the system to expected levels of incoming light intensity.

Again referring to FIG. 1, FIG. 3A and FIG. 3B, the amount of electrical energy needed to charge the diode 102 and the connected capacitor 107 is relatively small thereby significantly boosting the lifetime of the sensor system.

Thus, the spectral radiometer 100 can achieve sensitivity in several, adjustable wavelength-bands having adjustable detector sensitivity. Further, novel aspects of the exemplary embodiments of the spectral radiometer 100 include the ability to achieve fast, precise, multi-wavelength-band or adjustable wavelength-band adjustable detector sensitive measurements with extraordinary linearity and the ability to operate over several orders of magnitude of incoming light at low cost, (when an order of magnitude ratio is scaled to 10, the linearity and ability to operate, at least, approaches over three orders of magnitude of incoming light).

Other exemplary embodiments include: ultra low power consumption; easy adaptability to wavelength regions of interest by choosing diodes 102 with corresponding bandgap(s) to the adjustable wavelength-bands and/or modification of the reflection and/or transmission properties of the respective diodes 102; fast measurement; shock resistant properties; no degradation or wear off; no moving parts; low cost; different optical acceptance angles realized by modification of the optics of the encapsulation; very small dimensions; no sophisticated electronics or optics; direct readout from CPU 101 without external circuitry; very good linearity; operational over several orders of magnitude of incoming light intensity; can be used in harsh environments; and easy encapsulation of different diodes in very small housings.

Additional exemplary embodiments include: the usage of different bandgap energies for spectral sensing, by selecting different diodes; ease of encapsulation of diodes 102 integrated in one small housing, such as the 3 diode sensor section 201; individual addressability of all diodes 102, where diodes 102 with different sensitivity (i.e. different capacitance) can be used at the same time leading to a simultaneously multi-light-level sensitive sensor section 201, and where the sensitivity of each diode 102 can be changed before and/or after and/or during each measurement cycle (such as optionally actuating switch 108 for adding or removing capacitors 107 in the diode 102 circuits).

In additional exemplary embodiments, apart from pn-diodes, such as diode(s) 102, also spectrally sensitive resistors, Schottky diodes or any other spectrally sensitive element with photon-dependent charge generation/recombination or resistance properties can be used. Different elements can be used together and/or used at the same time to further increase the versatility of the sensor section 201 system. Optimization of the interplay between the microcontroller (i.e., CPU 101, the clock 117, the data storage 119 unit and other electrical components provides tuning for ultra-low power consumption.

The foregoing description of the specific embodiments will so fully reveal the general nature of the invention that others can, by applying knowledge within the art, readily modify and/or adapt for various applications such specific embodiments, without undue experimentation, without departing from the general concept of the present invention. Therefore, such adaptations and modifications are intended to be within the meaning and range of equivalents of the disclosed embodiments claimed herein and below, based on the teaching and guidance presented herein and the claims which follow:

What is claimed is:

1. A spectral radiometer apparatus measuring light intensity, detecting spectral distribution in different wavelength-bands, storing and transferring related data, the apparatus comprising:

a spectrally sensitive circuit element section, including one or more elements selected from a group of elements consisting of photon-dependent charge generation elements and recombination elements and additional charge characteristic components, selected from a group of additional charge characteristic components consisting of diode components and resistance capacitance components;

a central processing unit (CPU), including a computer processor and a plurality of input output ports, communicatively coupled to the spectrally sensitive circuit element section and a timing apparatus and a data storage device, where the computer processor contains program code in memory, which when executed by the computer processor causes the computer processor to measure incoming light intensity detected by the spectrally sensitive circuit element section, and additionally causes the CPU to calculate, record and further process light intensity data; and a case having a lid cover assembly removably fastened on top of the case, wherein the spectrally sensitive circuit element section and the central processing unit along with circuit wiring communicatively couples the spectrally sensitive circuit element section with the central processing unit, and the timing apparatus and the data storage device, and wherein program code residing in memory of the computer processor, when executed by the computer processor causes measurement of light intensity, detection of spectral distribution in different wavelength-bands, storage and transfer of related data, by the spectral radiometer apparatus, wherein the spectrally sensitive circuit element section, having an at least one or more elements selected from the group of elements consisting of photon-dependent charge generation elements and recombination elements and additional charge characteristic components, provides linearity of measurement sensitivity to incoming light in adjustable multi-wavelength-band spectral distributions at over three orders of magnitude of incoming light, wherein the at least one or more elements include one or more of pn-diodes, spectrally sensitive resistors, Schottky diodes and a plurality of other spectrally sensitive elements with photon-dependent charge generation and recombination and resistance properties, and wherein different elements can be used together and used at the same time to further increase versatility of the spectrally sensitive circuit element section.

2. The spectral radiometer apparatus, as recited in claim 1, further includes a coin cell size battery, in a system configuration having ultra low power consumption averaging 100 microwatts.

3. The spectral radiometer apparatus, as recited in claim 1, including the case, has a minimal size and weight having a width ranging from about 1½ inches up to about 3 inches; a depth ranging from about 1 inch up to about 2 inches; and a height ranging from about 2½ inches up to about 5 inches and having a weight ranging from about less than one tenth of a pound up to about two tenths of a pound.

4. The spectral radiometer apparatus, as recited in claim 1, wherein the data storage device has a memory storage capacity of up to at least 128 megabytes integrated in the apparatus.

5. The spectral radiometer apparatus, as recited in claim 1, wherein, the spectral radiometer apparatus is free of shock sensitivity and has a long-term monitoring operational capability in remote locations ranging from less than about 2 years up to about 10 years.

6. A diode based spectral radiometer apparatus measuring light intensity, detecting spectral distribution in different wavelength-bands, storing and transferring related data, the apparatus comprising:
    a spectrally sensitive circuit element section including a photon-dependent charge generation and recombination semiconductor diode having a charge characteristic, having a given bandgap energy and given reflection and absorption properties defining a wavelength within which the photon-dependent charge generation and recombination semiconductor diode absorbs light, wherein the charge characteristic includes an inherent capacitance across the photon-dependent charge generation and recombination semiconductor diode, and wherein the spectrally sensitive circuit element section including the photon-dependent charge generation and recombination semiconductor diode is encapsulated in a transparent housing;
    a central processing unit (CPU), including a computer processor and a plurality of input output ports, communicatively coupled to the spectrally sensitive circuit element section and a timing apparatus and a data storage device, where the computer processor contains program code in memory, which when executed by the computer processor causes the computer processor to measure incoming light intensity detected by the spectrally sensitive circuit element section, and additionally causes the CPU to calculate, record and further process light intensity data;
    a case having a lid cover assembly removably fastened on top of the case, wherein the spectrally sensitive circuit element section and the central processing unit along with circuit wiring communicatively coupling the spectrally sensitive circuit element section with the central processing unit, and the timing apparatus and the data storage device reside, and wherein program code residing in memory of the computer processor, when executed by the computer processor causes measurement of light intensity, detection of spectral distribution in different wavelength-bands, storage and transfer of related data, by the spectral radiometer apparatus; and
    an adjustable spectrally sensitive circuit element section having an additional charge characteristic of an external capacitance switchably connected in a connection position selected from a group of connection positions consisting of in parallel with the photon-dependent charge generation and recombination semiconductor diode and in series with the photon-dependent charge generation and recombination semiconductor diode and open across the photon-dependent charge generation and recombination semiconductor diode; wherein the external capacitance adjusts an amount of decay time of decreasing voltage across the photon-dependent charge generation and recombination semiconductor diode, according to expected levels of light intensity.

7. The diode based spectral radiometer apparatus, as recited in claim 6, wherein the transparent housing encapsulating the photon-dependent charge generation and recombination semiconductor diode has different optical acceptance angles realizable by modification of optics associated with a transparent material from which the transparent housing is composed.

8. A diode based spectral radiometer apparatus measuring light intensity, detecting spectral distribution in different wavelength-bands, storing and transferring related data, the apparatus comprising:
    a spectrally sensitive circuit element section including a photon-dependent charge generation and recombination semiconductor diode having a charge characteristic, having a given bandgap energy and given reflection and absorption properties defining a wavelength within which the photon-dependent charge generation and recombination semiconductor diode absorbs light, wherein the charge characteristic includes an inherent capacitance across the photon-dependent charge generation and recombination semiconductor diode, and wherein the spectrally sensitive circuit element section including the photon-dependent charge generation and recombination semiconductor diode is encapsulated in a transparent housing,
    a central processing unit (CPU), including a computer processor and a plurality of input output ports, communicatively coupled to the spectrally sensitive circuit element section and a timing apparatus and a data storage device, where the computer processor contains program code in memory, which when executed by the computer processor causes the computer processor to measure incoming light intensity detected by the spectrally sensitive circuit element section, and additionally causes the CPU to calculate, record and further process light intensity data; and
    a case having a lid cover assembly removably fastened on top of the case, wherein the spectrally sensitive circuit element section and the central processing unit along with circuit wiring communicatively coupling the spectrally sensitive circuit element section with the central processing unit, and the timing apparatus and the data storage device reside, and wherein program code residing in memory of the computer processor, when executed by the computer processor causes measurement of light intensity, detection of spectral distribution in different wavelength-bands, storage and transfer of related data, by the spectral radiometer apparatus,
        wherein the spectrally sensitive circuit element section includes a plurality of diodes, selected from a group of diodes consisting of an at least two diodes and an at least three diodes and an at least four diodes, wherein each diode of the plurality of diodes is made from a semiconductor material having different bandgap energy properties and different reflection properties and different absorption properties, and wherein each of the group of diodes is encapsulated in the transparent housing large enough to fully contain the at least two diodes and the at least three diodes and the at least four diodes.

9. The diode based spectral radiometer apparatus, as recited in claim 8, wherein each of the at least two diodes and the at least three diodes and the at least four diodes configured as a first, second and third spectrally sensitive circuit element section is inserted in a first, second and third opening on a first, second and third side of the case having the lid cover, wherein the spectrally sensitive circuit element section and the central processing unit along with circuit wiring communicatively coupling the spectrally sensitive circuit element section with the central processing unit, and the timing apparatus and the data storage device reside, providing directional detection and measurement of light intensity from different directions and different acceptance angles.

10. The diode based spectral radiometer apparatus, as recited in claim 9, wherein the spectrally sensitive circuit element section includes bandgap selection and includes switchably adjustable diode sensitivity with different capacitance, and provides diode sensitivity selection before, after and during measurement cycles, and provides measurement of incoming light intensity and spectral distribution in different wavelength-bands at different spectral sensitivities.

* * * * *